United States Patent [19]

Hakoun

[11] Patent Number: 4,469,400

[45] Date of Patent: Sep. 4, 1984

[54] CONNECTOR FOR A SINGLE OPTICAL FIBER

[75] Inventor: Roland Hakoun, Paris, France

[73] Assignee: Compagnie Lyonnaise de Transmissions Optiques, Clichy, France

[21] Appl. No.: 389,796

[22] Filed: Jun. 18, 1982

[30] Foreign Application Priority Data

Jun. 24, 1981 [FR] France .................... 81 12371

[51] Int. Cl.³ .............................................. G02B 7/26
[52] U.S. Cl. .................................................. 350/96.21
[58] Field of Search ...................................... 350/96.21

[56] References Cited

U.S. PATENT DOCUMENTS

| | | | |
|---|---|---|---|
| 4,019,241 | 4/1977 | Logan | 350/96.21 X |
| 4,050,781 | 9/1977 | Beauhaire | 350/96.21 |
| 4,056,305 | 11/1977 | McCartney et al. | 350/96.21 |
| 4,094,580 | 6/1978 | Cook et al. | 350/96.21 |
| 4,132,461 | 1/1979 | Jacques et al. | 350/96.21 X |

FOREIGN PATENT DOCUMENTS 0016575 10/1980 European Pat. Off. .
2020844A 11/1979 United Kingdom .

Primary Examiner—John D. Lee
Assistant Examiner—Akm E. Ullah
Attorney, Agent, or Firm—Sughrue, Mion, Zinn, Macpeak & Seas

[57] ABSTRACT

A connector for a single optical fiber comprises two half-connectors. Each half-connector comprises three rods for positioning the respective fiber. In the rear half of each half-connector these rods are cylindrical and maintained in position by a retaining ring. A channel for one of the fibers is defined between them. In the front half of each half-connector the rods are machined to form two flats, one on each side of the area of contact with the fiber. These machined portions of the rods are surrounded by a positioning ring. The respective assemblies of machined rods in the two half-connectors are engagable with one another plug-and-socket fashion to effect final alignment of the two fibers, the positioning rings of the two half-connectors at this time each surrounding the six interpenetrating machined rods.

4 Claims, 5 Drawing Figures

CONNECTOR FOR A SINGLE OPTICAL FIBER

BACKGROUND OF THE INVENTION

1. Field of the Invention

The present invention is concerned with optical connectors of the single fiber type used to effect an optical connection between two optical fibers with the end portions of the two fibers aligned to a high degree of accuracy.

2. Description of the Prior Art

A fiber positioning device for use in effecting a connection between two fibers is described in French Pat. No. 2 275 787 filed June 20, 1974 in the name of the Compagnie Générale d'Electricité. In this device the member for positioning a fiber or, properly speaking, for connecting two fibers together consists of three cylindrical rods of the same diameter held in side-by-side relationship so that their respective axes are parallel and so that there is defined between them a central channel intended to accommodate the fiber to be positioned or the two fibers to be connected.

In this device, the three rods may be maintained in position by a shrinkable sleeve which surrounds them and clamps them in contact with one another. It will be appreciated that the ratio between the diameter of the fiber or of the two fibers and the diameter of each of the three rods is defined so as to effect the positioning or connection to within the required alignment constraints. Two optical fibers to be connected, with their respective end portions disposed end to end in the channel between the three rods, are maintained in position relative to one another and aligned by virtue of the contact between the three rods and the end portions of the fibers, the contact areas extending substantially along three generatrices of the rods and defining between them a shape which is substantially an equilateral triangle when seen in the transverse plane.

In this device, at least one end of the rods may be beveled to a cone shape in order to facilitate insertion of the end part of the fiber on that side into the channel.

In this same device, each of the rods may be of slightly reduced diameter in the central portion corresponding to the area of connection between two fibers. In this case, the end portions of the two fibers are butted together in this area and, by virtue of the small free space thus provided between the rods in this area, and two fibers may be actually jointed together, by passing an electrical current through a tungsten wire disposed around the ends of the fibers.

While the clamping of the fibers between the three cylindrical rods in this device provides a high-quality connection, the insertion of the fibers in the channel thus defined remains difficult. Moreover, when making a connection between fibers, effected by merely inserting the fibers in the channel thus defined, it is necessary to provide means for maintaining and locking the fibers in position in the channel, and such means are not necessarily simple to implement.

The invention is therefore directed towards an optical connector for single fibers employing the clamping principle obtained through the use of three rods, but in the form of two half-connectors in each of which the end portion of one fiber is suitably positioned so that the fitting and maintaining together of the two half-connectors effects the necessary fixed connection.

SUMMARY OF THE INVENTION

A connector for a single optical fiber, comprises two half-connectors adapted to receive respective end portions of two fibers to connect, and assembly means for securing together said two half-connectors so as to maintain the connection, wherein each half-connector comprises positioning means for the fiber end portion it receives in the form of three cylindrical rods maintained in side-by-side relationship so as to define between them a central channel into which said fiber end portion is inserted, substantially in contact with each rod in a contact area extending along a generatrix, wherein each of said rods is formed with two flats which extend over a front half of each half-connector and on each side of the respective contact area so as to define, in each half-connector, an assembly which is adapted to form a plug-and-socket type engagement with that of the other half-connector, the respective fiber end being positioned substantially centrally of said assembly, said connector further comprising, on the front half of each half-connector, at least one positioning ring surrounding said portions of said rods formed with said flats and applying radial force to said assemblies so as to retain said end portions of said fibers in position.

According to another characteristic feature of the invention, said flats on each rod are substantially symmetrical relative to a longitudinal median plane of the rod passing through its area of contact with the fiber, their inclination relative to this plane being substantially the same for each rod and in each of said half-connectors, at least said front halves of which are substantially identical.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2A is a schematic representation of the method of assembling the two half-connectors.

DESCRIPTION OF THE PREFERRED EMBODIMENT

Figure 1:
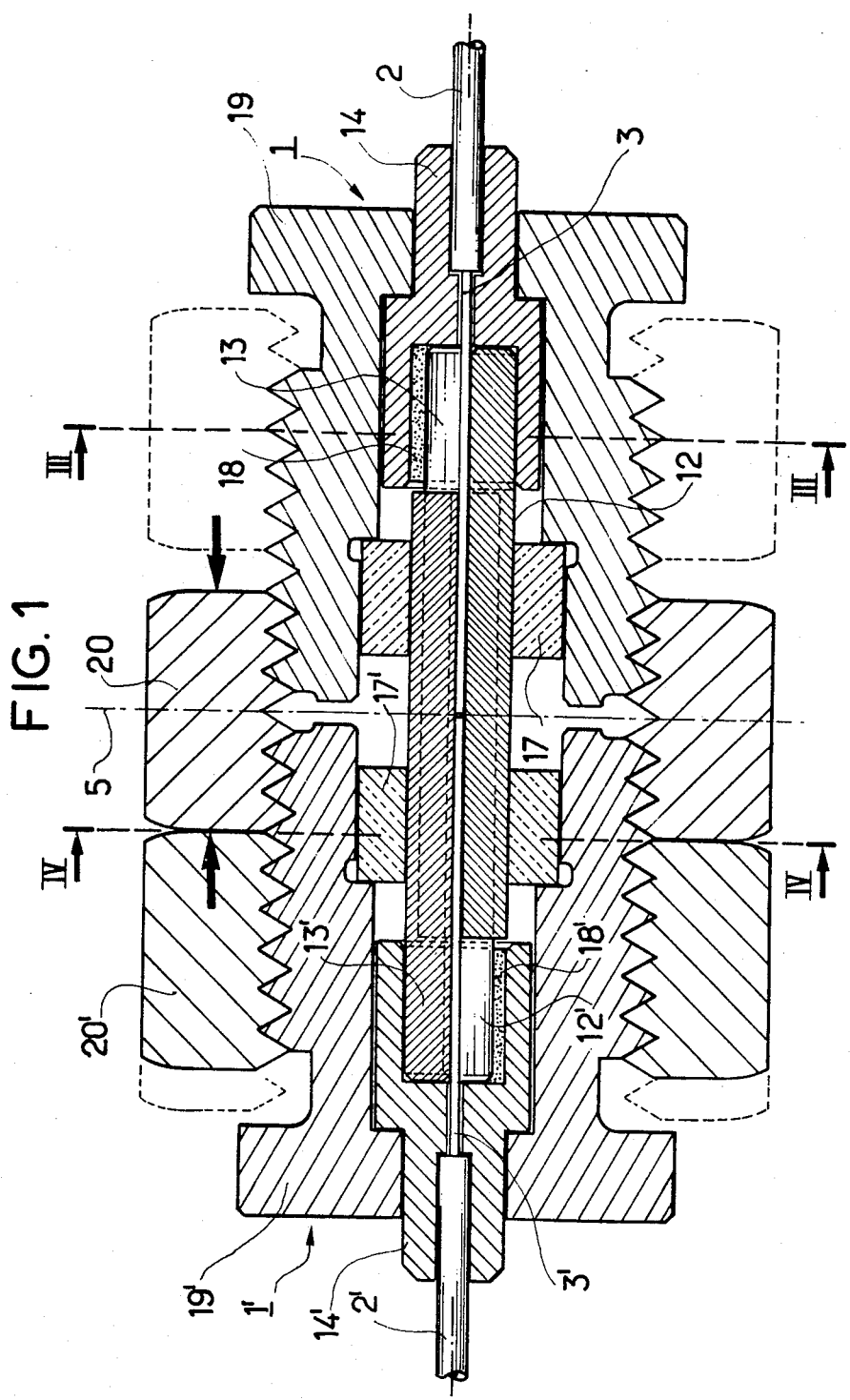
FIG. 1 is a longitudinal cross-section through a connector in accordance with the invention.
Figure 2:
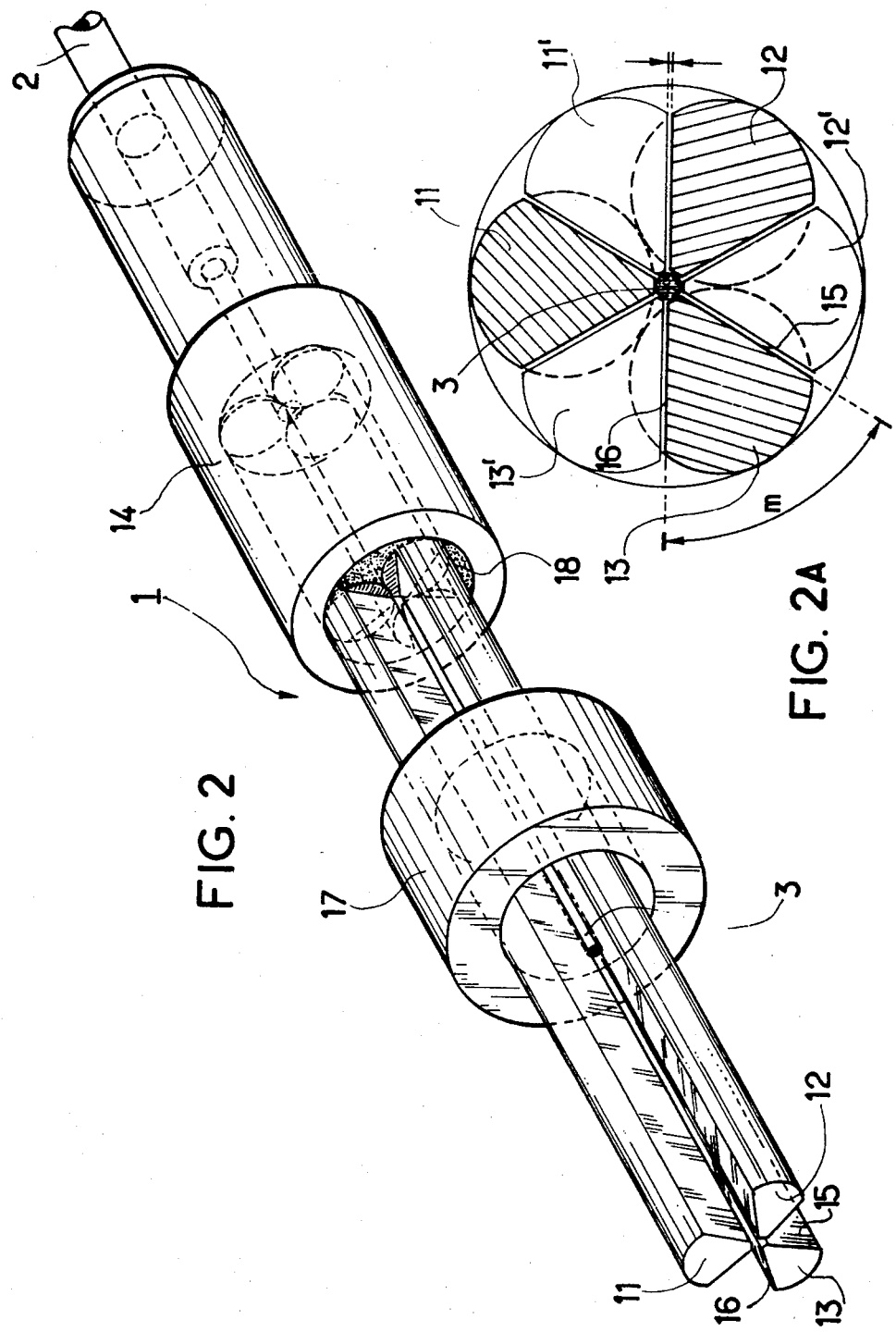
FIG. 2 is a view in perspective showing the central part of one of the two half-connectors in accordance with the invention.

Referring to FIGS. 1 and 2, the optical connector in accordance with the invention is formed by two half-connectors 1 and 1' partially engagable one within the other and in this instance identical to one another. The connector is designed to connect two fibers 3 and 3'. Fibers 3 and 3' are sheathed, only the end portions of the two fibers to be connected being stripped. Their respective sheaths are designated 2 and 2'.

Each of the two half-connectors comprises three rods 11, 12 and 13 and 11', 12' and 13', the three rods being cylindrical and retained within a retaining ring 14, 14'. With their respective retaining ring and over the length thereof they constitute the rear part of the half-connector, hereinafter referred to as the rear half of the half-connector. The three rods are machined so that each has two flats such as flats 15 and 16 on rod 13. They are further surrounded by one or more positioning rings 17, 17' and define, in conjunction with their respective positioning ring and over their machined length, the front part of the half-connector, hereinafter referred to as the front half of the half-connector.

Figure 3:
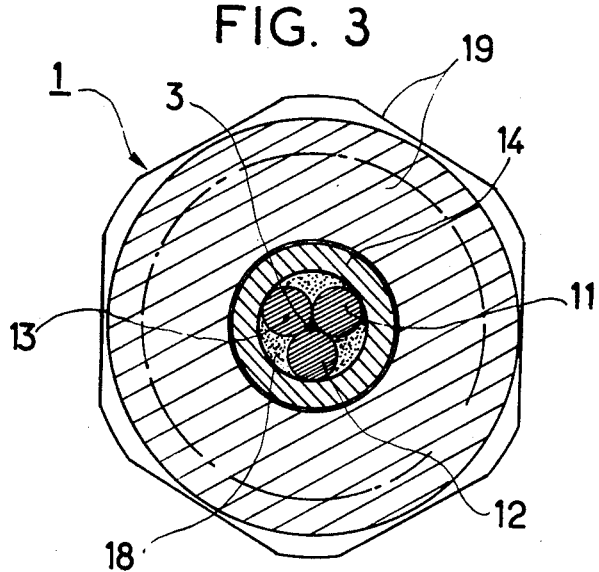
FIGS. 3 and 4 are two transverse cross-sections through the connector in accordance with the invention, on lines III—III and IV—IV, respectively, in FIG. 1.

With reference also to FIG. 3, in the rear half of each half-connector the three cylindrical rods are held together so as to be substantially tangential to one another in pairs by their retaining ring 14 or 14', inside which they are fixed, by means of a resin 18, 18', for example. The three cylindrical rods, thus maintained in position, delimit a central channel in which the inserted fiber 3 or 3' is in contact with the three cylindrical rods along the length of a contact area extending along a respective generatrix. These cylindrical rods define first means for positioning the fiber 3 or 3' in the half-connector 1 or 1'.

The central channel delimited by the three rods is an extension of a guide channel whose diameter is similar to that of the sheathed fiber and formed by retaining ring 14 or 14' at the end of the half-connector concerned in this rear half.

Figure 4:
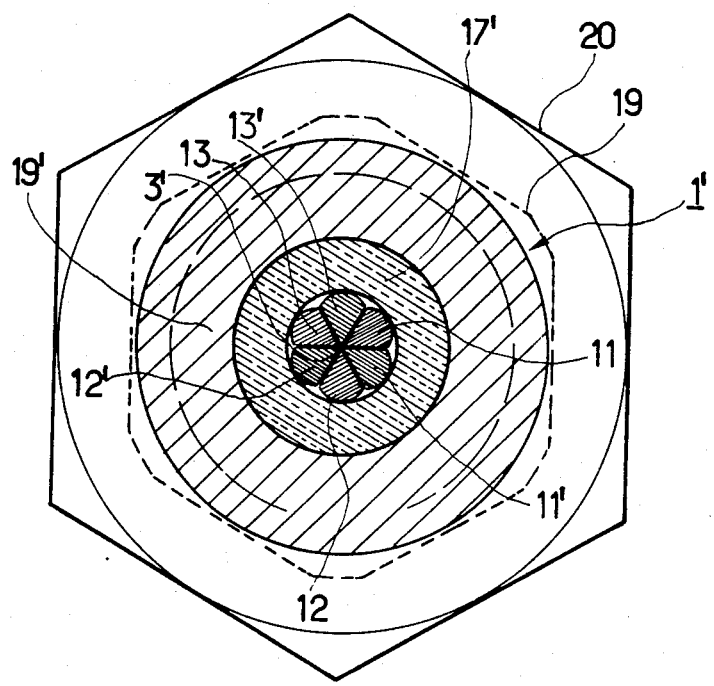

With reference also to FIGS. 2A and 4, in the front half of each half-connector the three rods 11, 12 and 13 and 11', 12' and 13', elsewhere cylindrical, are machined to present two flats such as 15 and 16 on respective sides of the axial plane passing through the area of contact between each rod and the fiber. In this instance the two flats are substantially symmetrical relative to this axial plane, being at an angle m to one another of substantially 60°. The three rods thus machined define an assembly which can be engaged plug-and-socket fashion in the corresponding assembly defined by the machined and substantially identical rods of the other half-connector. In each half-connector, positioning ring 17 or 17' is mounted on the assembled three machined rods beyond the median portion of the assembly, that is to say on the same side as retaining ring 14 or 14'. Within each of positioning rings 17 and 17' the portions of the rods on the periphery of the assembly thus formed are still cylindrical and each is tangential to the inner wall of the positioning ring. The portions of the rods in the central part of the assembly thus formed are tangential to the inserted fiber 3 or 3', these contact areas still being cylindrical.

In each of the two half-connectors, the fiber 3 or 3' it accommodates is inserted through the retaining ring into the central channel between the cylindrical rods and between the machined portions of these rods, its end being positioned substantially midway along the front half of the half-connector. Thus when the two half-connectors are engaged with one another, by engaging the machined rods of the front half of one between the machined rods of the front half of the other, the ends of the rods are substantially in contact and rigorously face-to-face.

With regard to this method of connecting the two fibers, note that in each half-connector the three machined rods surrounded by their own respective positioning ring implement pre-positioning of the fiber received by the half-connector, with a view to subsequent axial alignment of this fiber with the other fiber. When the two connectors are engaged one within the other, positioning rings 17 and 17' are disposed to either side of the plane at which the fibers join, represented schematically in FIG. 1 by the chain-dotted line 5. Each is close to this plane and surrounds the machined rods of the two interpenetrating assemblies. By virtue of the radial force which each exerts identically on the six rods, each contributes to the final and extremely accurate alignment of the two fibers. This accurate axial alignment is a direct result of the effect of rings 17 and 17' on the six interpenetrating rods. It complements the axial pre-positioning of each fiber in its respective half-connector and compensates the clearance left between the rods of the interpenetrating assemblies to facilitate such penetration.

It will be appreciated that the inside diameter of each of positioning rings 17 and 17' is accurately defined as a function of the initial cylinder diameter of the rods, itself defined as a function of the diameter of the fibers. To this end, these rings are advantageously of a synthetic gemstone such as ruby, and the rods which transmit the radial forces may be of steel or glass.

Finally, the connector in accordance with the invention is equipped with mechanical means for assembling the two half-connectors together. As shown more particularly in FIG. 1, these assembly means constitute the external body of the connector and are with advantage identical on the two half-connectors. They comprise, on each of the two non-interpenetrating half-connectors, a bush 19, 19' which is partially threaded externally and an associated nut 20, 20'. Bush 19 is mounted on maintaining ring 14 and positioning ring 17, at least partially covering the maintaining ring and extending beyond the positioning ring to a point which is substantially midway along the assembly of the three machined rods, that is to say substantially to the jointing plane 5. The bush has internal shoulders which butt up against a corresponding shoulder on the outside surface of maintaining ring 14 and the edge of positioning ring 17, respectively. It may be fixed to at least one of the two rings, by bonding it to the surface thereof by means of a resin, for example. The threaded part of bush 19 is that at the machined rod end and carries nut 20. It is formed with an external shoulder constituting an abuttment for nut 20. Bush 19' is mounted in the same way as bush 19 but on rings 14' and 17', carrying nut 20'. The two halfconnectors are held together by screwing the nut on one of the two bushes, in this instance nut 20, onto the thread on the other bush, in this instance bush 19'. Thus this nut 20 is threaded simultaneously onto the bushes of both half-connectors, the other nut 20' acting as a locknut.

MODIFICATIONS

As will be appreciated, different assembly means may be used, in the form, for example, of two caps which engage plug-and-socket fashion with a bayonet-type locking facility.

In the foregoing description it has been stated that each positioning ring was abutted against an internal shoulder in the bush and could be fixed to its internal wall. It could likewise be so abutted and fixed to any other assembly means constituting the outer body of the connector. As an alternative, each of the positioning rings could be fixed to the three machined rods forming part of its half-connector by means of a resin.

As already indicated, this connector provides for connecting two fibers with excellent centering of the fibers, resulting in a significant reduction in transmission attenuation, even without the use of a matching liquid. A matching liquid, such as polyisobutylene, may readily be used to wet the front surfaces of the fibers to be connected in order to enhance the performance of the connector.

Note also that this connector results in a simple connection procedure, requiring only slight relative rotation of the two half-connectors, through 60°. This applies only slight torsion to the fibers, with no deleterious effects. Finally, the connector is compact in the axial dimension.

It will be understood that various changes in the details, materials and arrangements of parts, which have been herein described and illustrated in order to explain the nature of the invention, may be made by those skilled in the art within the principle and scope of the invention as expressed in the appended claims.

It is claimed:

1. A connector for a single optical fiber, comprising two half-connectors adapted to receive respective end portions of two fibers to be connected, and assembly means for securing together with two half-connectors so as to maintain the connection, and wherein each half-connector comprises positioning means for the fiber end portion it receives in the form of three cylindrical rods maintained in side-by-side relationship so as to define between them a central channel into which said fiber end portion is inserted, substantially in contact with each rod in a contact area extending along a generatrix, the improvement wherein each of said rods is formed with two flats, said flats extending over a front half of each half-connector and on each side of the respective contact area so as to define, when said half connectors are joined, an assembly of six side by side rods alternating from said half-connectors forming a plug-and-socket type engagement between the half connectors, the respective fiber end being positioned substantially centrally of said assembly, and said connector further comprising, on the front half of each half-connector, at least one positioning ring surrounding said portions of all of said rods formed with said flats from both half-connectors, and applying radial force to all of said rod portions in common so as to retain said end portions of said fibers in position.

2. A connector according to claim 1, wherein said flats on each rod are substantially symmetrical relative to a longitudinal median plane of the rod passing through its area of contact with the fiber, their inclination relative to this plane being substantially the same for each rod and in each of said half-connectors, at least said front halves of which are substantially identical.

3. A connector according to claim 1, wherein said positioning ring of each half-connector is attached to said rods in said front half of each half-connector.

4. A connector according to claim 1, wherein said positioning rings are attached to said assembly means of respective half-connectors which together constitute an outer body of said connector.

* * * * *